(12) United States Patent
Sugiyama et al.

(10) Patent No.: US 11,354,517 B2
(45) Date of Patent: Jun. 7, 2022

(54) DIALOGUE METHOD, DIALOGUE SYSTEM, DIALOGUE APPARATUS AND PROGRAM

(71) Applicants: NIPPON TELEGRAPH AND TELEPHONE CORPORATION, Chiyoda-ku (JP); OSAKA UNIVERSITY, Suita (JP)

(72) Inventors: Hiroaki Sugiyama, Soraku-gun (JP); Hiromi Narimatsu, Soraku-gun (JP); Yuichiro Yoshikawa, Suita (JP); Takamasa Iio, Suita (JP); Tsunehiro Arimoto, Suita (JP); Hiroshi Ishiguro, Suita (JP)

(73) Assignees: NIPPON TELEGRAPH AND TELEPHONE CORPORATION, Chiyoda-ku (JP); OSAKA UNIVERSITY, Suita (JP)

( * ) Notice: Subject to any disclaimer, the term of this patent is extended or adjusted under 35 U.S.C. 154(b) by 146 days.

(21) Appl. No.: 16/491,301

(22) PCT Filed: Jan. 26, 2018

(86) PCT No.: PCT/JP2018/002505
§ 371 (c)(1),
(2) Date: Sep. 5, 2019

(87) PCT Pub. No.: WO2018/163646
PCT Pub. Date: Sep. 13, 2018

(65) Prior Publication Data
US 2020/0034434 A1  Jan. 30, 2020

(30) Foreign Application Priority Data

Mar. 10, 2017  (JP) .............................. JP2017-046364

(51) Int. Cl.
*G06F 40/40*  (2020.01)
*G06F 3/01*  (2006.01)
(Continued)

(52) U.S. Cl.
CPC .............. *G06F 40/40* (2020.01); *G06F 3/011* (2013.01); *G06F 3/16* (2013.01); *G10L 15/1815* (2013.01);
(Continued)

(58) Field of Classification Search
USPC ................ 704/246, 247, 251, 252, 257, 275
See application file for complete search history.

(56) References Cited

U.S. PATENT DOCUMENTS

| 8,027,458 | B1* | 9/2011 | Pollock | ............... H04M 3/5166 |
| | | | | 379/265.12 |
| 2005/0278180 | A1* | 12/2005 | O'Neill | .................. G10L 15/22 |
| | | | | 704/275 |

(Continued)

OTHER PUBLICATIONS

International Search Report dated Apr. 3, 2018 in PCT/JP2018/002505 filed Jan. 26, 2018.
(Continued)

*Primary Examiner* — Leonard Saint Cyr
(74) *Attorney, Agent, or Firm* — Oblon, McClelland, Maier & Neustadt, L.L.P.

(57) ABSTRACT

It is an object of the present invention to prevent inattentive listening to a dialogue of an agent without taking it seriously and to make it easier to understand the dialogue with the agent. A dialogue system 100 conducts a dialogue with a user 101. A humanoid robot 50-1 presents a leap-in-logic utterance, which is an utterance, of which a logical structure is partially missing. The user 101 expresses a confirmation action which is an action confirming the missing information in the leap-in-logic utterance. The humanoid robot 50-1 presents a supplementary utterance which is an utterance describing the missing information.

9 Claims, 3 Drawing Sheets

(51) Int. Cl.
*G06F 3/16* (2006.01)
*G10L 15/18* (2013.01)
*G10L 15/22* (2006.01)

(52) U.S. Cl.
CPC ........ *G10L 15/22* (2013.01); *G10L 2015/223* (2013.01)

(56) References Cited

U.S. PATENT DOCUMENTS

| | | | | |
|---|---|---|---|---|
| 2008/0043982 | A1* | 2/2008 | Waalkes | H04M 3/5235 379/265.02 |
| 2013/0251118 | A1* | 9/2013 | Waalkes | H04M 3/5235 379/88.01 |
| 2016/0164813 | A1* | 6/2016 | Anderson | H04L 51/32 709/206 |

OTHER PUBLICATIONS

Kawahara, T., "Toward Dialogue System with Conversational Utterance," Information Processing, vol. 45, No. 10, Oct. 2004, 19 pages (with English translation).

Arimoto, T. et al., "Impression Evaluation of Dialogue without Voice Recognition by Plural Robots," Conference of the Robotics Society of Japan, 2016, 9 pages (with partial English translation).

Sugiyama, H. et al., "Leveraging Dependency Relations and Sentence Examples in Web-scale Corpus for Open-domain Utterance Generation," Transactions of the Japanese Society for Artificial Intelligence, vol. 30, No. 1, 2015, 22 pages (with partial English translation).

Meguro, T. et al., "Building a conversational system based on the fusion of rule-based and stochastic utterance generation," Proceedings of the 28$^{th}$ Annual Conference of the Japanese Society for Artificial Intelligence, 2014, vol. 28, 8 pages (with partial English translation).

* cited by examiner

DIALOGUE METHOD, DIALOGUE SYSTEM, DIALOGUE APPARATUS AND PROGRAM

TECHNICAL FIELD

The present invention relates to a technique applicable to robots or the like communicating with humans allowing a computer to have a dialogue with humans using a natural language or the like.

BACKGROUND ART

In recent years, research and development on robots communicating with humans has been progressing and put to practical use at various scenes. For example, at the site of communication therapy, there is a usage pattern in which a robot serves as a companion to talk with a person feeling loneliness. More specifically, a robot plays a role of a listener to a resident at elder care facilities, and can thereby heal the loneliness of the resident, show the resident having dialogue with the robot, and have chances to start dialogue between the resident and people around the resident such as his/her family and nurses. In addition, at the site of communication training, for example, there is a usage pattern in which a robot becomes a training partner. More specifically, the robot becomes a training partner for foreign language learners at foreign language learning facilities, thus helping the foreign language learners to efficiently proceed with foreign language learning. Furthermore, in an application as an information presentation system, robots have a dialogue with each other and have their dialogue heard by people as a basis, sometimes talk to people, cause the people to join in dialogue without making the people bored, and can thereby present information in a form easily acceptable to the people. More specifically, when people feel bored at meeting places, a bus stop, a platform at a station or the like in a town or when people can afford to participate in a dialogue at home, a classroom or the like, it is possible to expect efficient presentation of information such as news, merchandise introduction, introduction of a store of information or knowledge, education (for example, nursery and education of children, education in the liberal arts for adult people, moral enlightenment). Furthermore, in an application as an information collection system, there is a usage pattern in which a robot collects information while talking to people. Since it is possible to maintain a feeling of dialogue through communication with the robot, the system can gather information without giving people any feeling of oppression that they are being listened to by a third party. More specifically, the system is expected to be applicable to a personal information survey, a market survey, a merchandise evaluation, a taste investigation for recommended commodity or the like. Thus, a variety of applications are expected from communication between humans and robots, and an implementation of a robot that interacts with users more naturally is expected. With the wide spread of smartphones, chat services such as LINE (registered trademark) are also realized whereby a plurality of users chat with each other substantially in real time, enjoying dialogue among the users. By applying a technique of dialogue between users and robots to this chat service, it is possible to implement a chat service whereby robots can have dialogues with users more naturally even in the absence of any user as a chatting partner.

In the present specification, hardware which becomes a dialogue partner of a user such as robots used in these services or chatting partner or computer software for causing a computer to function as hardware to become the user's dialogue partner are generically called an "agent." Since the agent is intended to become the user's dialogue partner, the agent may be personified such as a robot or chatting partner, personalized or may possess characters or individuality.

The key to the implementation of these services is a technique that enables the agent implemented by hardware or computer software to have a dialogue with humans naturally.

An example of the above-described agent is a voice dialogue system described in Non-Patent Literature 1 that voice-recognizes a user utterance, understands/infers intention of the utterance and gives an appropriate response. Research on voice dialogue systems has been actively carried out with the development of voice recognition technology and has been put to practical use in automatic voice response systems, for example.

Another example of the above-described agent is a scenario dialogue system that has a dialogue with a user about a specific topic in accordance with a predetermined scenario. The scenario dialogue system allows the user to continue a dialogue as long as the dialogue develops in accordance with the scenario. For example, a dialogue system described in Non-Patent Literature 2 is a system that develops a dialogue between a user and a plurality of agents while including interruptions by the agents or exchanges between the agents. For example, an agent utters a question prepared in a scenario to the user and when the utterance of an answer from the user to the question corresponds to an option prepared in the scenario, the agent functions to make an utterance corresponding to the option. That is, the scenario dialogue system is a dialogue system in which the agent makes an utterance based on a scenario stored in advance in the system. In this dialogue system, the agent asks a question to the user, and when the agent receives an answer from the user, the agent may fend off the question by nodding "I see" regardless of contents of the user utterance or the agent may interrupt the dialogue by changing the topic, and can thereby respond in such a way that even when the user utterance is deviated from the original topic, the user will not feel a breakup of the story.

A further example of the above-described agent is a chat-oriented dialogue system in which the agent makes an utterance along with utterance contents of the user so that the user and the agent develop a natural dialogue. For example, a dialogue system described in Non-Patent Literature 3 is a system for implementing a chat-oriented dialogue between the user and the system in which while focusing on matters peculiar to the context in a plurality of dialogues made between the user and agent, the system makes an utterance according to a prescribed rule using a word included in the utterance of the user or agent as a trigger. The rule used by the chat-oriented dialogue system is not only the prescribed one but may also be one automatically generated based on contents of the user utterance or may be one automatically generated based on an immediately preceding utterance made by the user or agent or an utterance made in the vicinity thereof or may be one automatically generated based on an utterance at least including an immediately preceding utterance made by the user or agent or an utterance made in the vicinity thereof. Non-Patent Literature 3 describes a technique of automatically generating a rule based on words in a co-occurrence relation or in a dependency relation with words included in a user utterance. A dialogue system described, for example, in Non-Patent Literature 4 is a system in which a manually described rule is merged with a rule described using a statistical utterance generation technique to thereby reduce the rule generation cost. Unlike the scenario dialogue system, the chat-oriented dialogue system is not such a system in which the agent makes an utterance in accordance with a prepared scenario, and so there will be no such situation that the agent's utterance does not correspond to the user utterance and the agent can make an utterance based on at least contents of the user utterance or an immediately preceding utterance made by the user or agent or an utterance made in the vicinity thereof. That is, the chat-oriented dialogue system is a dialogue system in which the agent makes an utterance based on at least contents of the user utterance or an immediately preceding utterance made by the user or agent or an utterance made in the vicinity thereof. These chat-oriented dialogue systems can explicitly respond to the user utterances.

PRIOR ART LITERATURE

Non-Patent Literature

Non-Patent Literature 1: Tatsuya Kawahara, "Voice Dialog System Using Spoken Language," Information Processing, vol. 45, no. 10, pp. 1027-1031, October 2004

Non-Patent Literature 2: Tsunehiro Arimoto, Yuichiro Yoshikawa, Hiroshi Ishiguro, "Impression Evaluation of Dialog without Voice Recognition by Plural Robots," Conference of the Robotics Society of Japan, 2016

Non-Patent Literature 3: Hiroaki Sugiyama, Toyomi Meguro, Ryuichiro Higashinaka, Yasuhiro Minami, "Leveraging Dependency Relations and Sentence Examples in Web-scale Corpus for Open-domain Utterance Generation," Transactions of the Japanese Society for Artificial Intelligence, vol. 30 (1), pp. 183-194, 2015

Non-Patent Literature 4: Toyomi Meguro, Hiroaki Sugiyama, Ryuichiro Higashinaka, Yasuhiro Minami, "Building a conversational system based on the fusion of rule-based and stochastic utterance generation," Transactions of the Japanese Society for Artificial Intelligence, vol. 28, pp. 1-4, 2014

SUMMARY OF THE INVENTION

Problems to be Solved by the Invention

When the dialogue system changes a topic or scenario of a dialogue, the change may give an abrupt impression. Even when an attempt is made to predict a degree of connectedness between topics or scenarios of the dialogue, evaluations thereof may not always be reasonable. Furthermore, if dialogues between agents continue to be smoothly connected, this may give an impression as if presenting play-acting, thus causing a real dialogue feeling to decrease or causing the user's understanding to fail to catch up with the progress of the dialogue.

Furthermore, a dialogue presented by the dialogue system often involves less catches or bland topics to avoid any breakup of the dialogue, which may cause the user to have less sympathy with the dialogue system. In this case, even if the user is not very satisfied with the agent's utterance, the user often inattentively listens to the dialogue without taking it seriously.

In view of the above-described problems, it is an object of the present invention to implement a dialogue system and a dialogue apparatus capable of preventing the user from inattentively listening to an agent's dialogue without taking it seriously and making the dialogue with the agent easier to understand.

Means to Solve the Problems

In order to solve the above-described problems, a dialogue method of the present invention is a dialogue method executed by a dialogue system that conducts a dialogue with a user, the method comprising: an utterance presentation step in which a presentation part presents a leap-in-logic utterance that is an utterance, of which a logical structure is partially missing; and a supplementary presentation step in which after a confirmation action which is an action to confirm information missing in the leap-in-logic utterance is expressed, the presentation part presents a supplementary utterance which is an utterance describing the missing information.

Effects of the Invention

The present invention intentionally presents an utterance, which is hard to understand because of partially lack of its logical structure, prevents the user from inattentively listening to the agent's utterance without taking it seriously, and can thereby implement a dialogue system and a dialogue apparatus allowing the user to easily understand the dialogue with the agent. Inconsistency can occur even in a dialogue between agents, but the present invention demonstrates that a normal state can be restored from such a state, and thereby gives the user an impression that the agent is an intellectual being, thus making it possible to implement a dialogue system and a dialogue apparatus allowing the user to easily understand a dialogue between the agents.

DETAILED DESCRIPTION OF THE EMBODIMENTS

Figure 1:
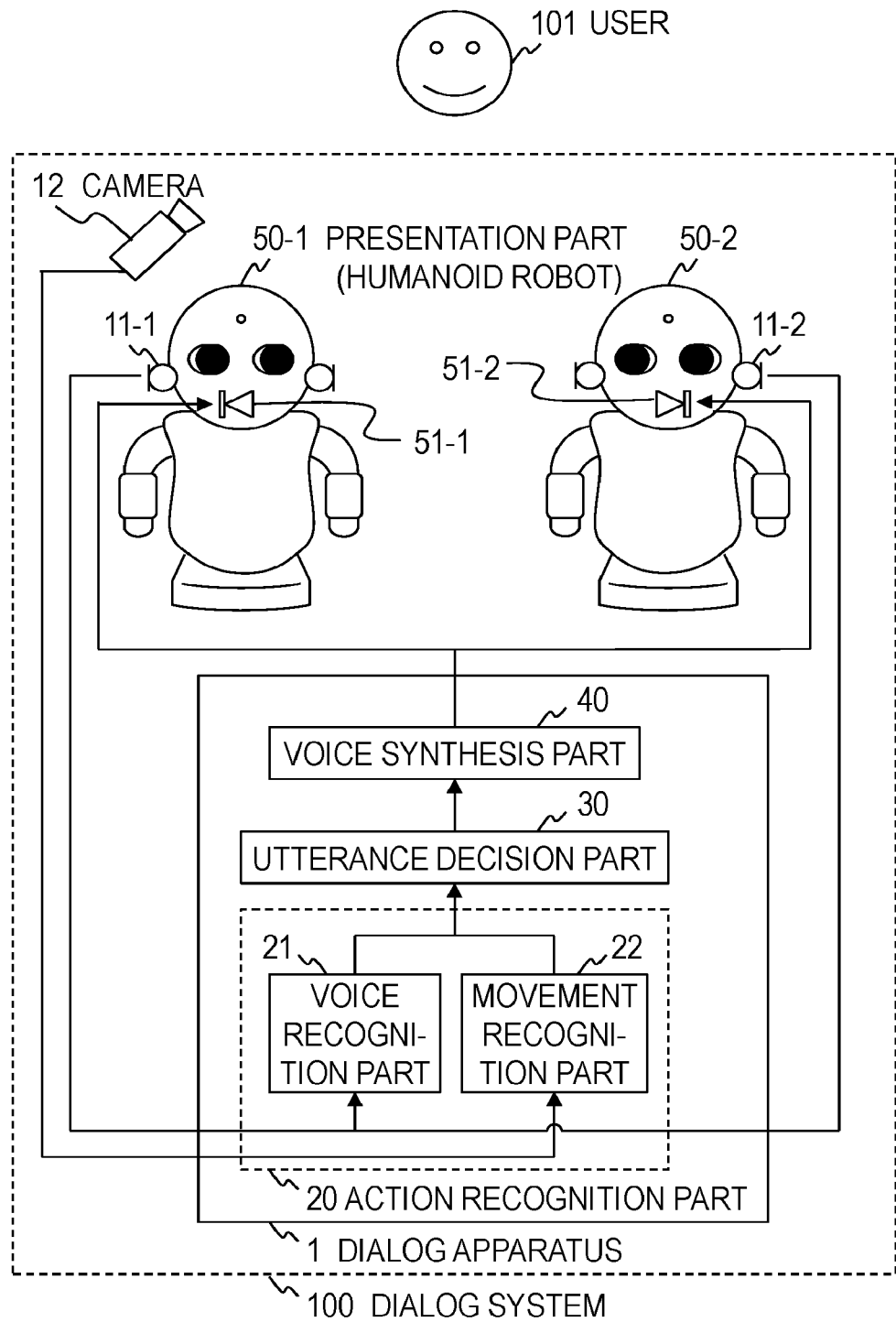
FIG. 1 is a diagram illustrating a functional configuration of a dialogue system of an embodiment.

In the present invention, a dialogue system presents an utterance with leap-in-logic contents (e.g., utterance with leap-in-logic contents or utterance with words serving as keys to a topic omitted) to thereby encourage interrupts by a user or other agents. Furthermore, the dialogue system includes an utterance with leap-in-logic contents in a dialogue between agents to create catches in the dialogue between the agents to thereby encourage interrupts by the user. Alternatively, the agent presents an utterance which is generally hard to accept, interposes interrupts by the user or other agents to make an utterance supplementing the contents. A word indicating that a topic is changed may also be presented before presenting an utterance with leap-in-logic contents or an utterance which is generally hard to accept. This makes it less likely that the user will inattentively listen to the agent's utterance without taking it seriously and allows the user to understand the dialogue with the agent more easily. Furthermore, since it is demonstrated that inconsistency may occur even in a dialogue between agents, and it is possible to restore the system from that state, the user may have an impression that the agent is an intellectual being and it is easier to understand the dialogue between the agents.

Hereinafter, embodiments of the present invention will be described in detail. Note that components having the same functions in the accompanying drawings are assigned the same reference numerals and overlapping description will be omitted.

The dialogue system of the embodiment is a system in which at least one humanoid robot conducts a dialogue with a user. That is, the dialogue system of the embodiment is an example of a case where the agent is a humanoid robot. As shown in FIG. 1, a dialogue system 100 includes a dialogue apparatus 1, an input part 10 constructed of a microphone 11 and a camera 12 and a presentation part 50 provided with at least a speaker 51. The dialogue apparatus 1 is provided with, for example, an action recognition part 20, an utterance decision part 30 and a voice synthesis part 40. The action recognition part 20 is provided with, for example, a voice recognition part 21 and a movement recognition part 22. The dialogue system 100 executes processes in respective steps, which will be described later, and thereby implements a dialogue method of the embodiment.

The dialogue apparatus 1 is a special apparatus configured by causing a well-known or dedicated computer provided with, for example, a central processing unit (CPU) and a main storage apparatus (RAM: Random Access Memory) to read a special program. The dialogue apparatus 1, for example, executes each process under the control of the central processing unit. Data inputted to the dialogue apparatus 1 and data obtained through each process are stored, for example, in the main storage apparatus, and the data stored in the main storage apparatus is read as required and used for other processes. Furthermore, at least part of each processing part of the dialogue apparatus 1 may be constructed of hardware such as an integrated circuit.

[Input Part 10]

The input part 10 may be configured to be integral with or partially integral with the presentation part 50. In the example in FIG. 1, microphones 11-1 and 11-2 which are parts of the input part 10 are mounted on the heads (positions of the ears) of humanoid robots 50-1 and 50-2 which are the presentation parts 50. In the example in FIG. 1, the camera 12 which is a part of the input part 10 is provided independently, but, for example, the camera 12 may be mounted on the heads (positions of the eyes) of the humanoid robots 50-1 and 50-2. In the example in FIG. 1, the presentation part 50 is constructed of the two humanoid robots 50-1 and 50-2, but the presentation part 50 may be constructed of one humanoid robot and the presentation part 50 may be constructed of three or more humanoid robots.

The input part 10 is an interface for the dialogue system 100 to acquire at least one of a user utterance (verbal action) and movement (non-verbal action). In other words, the input part 10 is an interface to input a user action to the dialogue system 100. For example, the input part 10 is the microphone 11 to collect a voice of user utterance and convert it to a voice signal. When the input part 10 is a microphone, the microphone may be enabled to collect the voice uttered by a user 101. That is, FIG. 1 is an example and either one of the microphone 11-1 or 11-2 may not be provided. Furthermore, one or more microphones provided in places different from the humanoid robots 50-1 and 50-2 in the vicinity of the user 101 or a microphone array provided with a plurality of microphones are used as the input part so as to adopt a configuration not provided with both the microphones 11-1 and 11-2. The microphone 11 outputs an acoustic signal obtained through conversion. The acoustic signal outputted from the microphone 11 is inputted to the voice recognition part 21 of the action recognition part 20. The input part 10 is, for example, the camera 12 to collect a physical movement of the user and convert it to a video signal. When the input part 10 is a camera, the camera may be enabled to record a physical movement of the user 101. That is, FIG. 1 is an example, and the camera 12 may be one camera or a plurality of cameras. The camera 12 outputs the video signals obtained through the conversion. The video signals outputted from the camera 12 are inputted to the movement recognition part 22 of the action recognition part 20.

[Action Recognition Part 20]

The action recognition part 20 receives at least one of the acoustic signal collected by the microphone 11 and the video signal recorded by the camera 12 as input, obtains information representing contents of the user action using at least one of the voice recognition part 21 and the movement recognition part 22, and outputs the information to the utterance decision part 30.

[Voice Recognition Part 21]

The voice recognition part 21 voice-recognizes the acoustic signal inputted from the microphone 11 and outputs text obtained as the recognition result. The text outputted from the voice recognition part 21 is included in the information representing contents of the user action outputted from the action recognition part 20. The method of voice recognition carried out by the voice recognition part 21 may be any existing voice recognition technique and any optimum technique may be selected as appropriate in accordance with an operating environment or the like. Note that when no voice is included in the acoustic signal, no text is obtained as the recognition result, and so the voice recognition part 21 does not output text and no text is included in the information representing contents of the user action outputted by the action recognition part 20.

[Movement Recognition Part 22]

The movement recognition part 22 recognizes the movement of the video signal inputted from the camera 12, obtains and outputs information representing contents of the user movement. The information representing the contents of the user movement outputted from the movement recognition part 22 is included in the information representing contents of the user action outputted from the action recognition part 20. The method of movement recognition carried out by the movement recognition part 22 is a method using, for example, a change in the user's expression or the like. In this method, the movement recognition part 22 acquires time-sequential images of the user's face from the inputted video signal and acquires contents of the user movement which are variations of features (e.g., size of the pupil, position of the tail of the eye, positions of the eyes, position of angle of mouth, degree of opening of mouth) from the acquired time-sequential images. The movement recognition part 22 obtains contents of the user movement corresponding to each time in the inputted video signal, generates time-sequential data representing contents of the user movement and outputs the generated time-sequential data as information representing contents of the user movement. However, the above-described movement recognition method is an example, and the movement recognition method carried out by the movement recognition part 22 may be any existing movement recognition technique or an optimum one may be selected as appropriate in accordance with the operating environment or the like.

[Utterance Decision Part 30]

The utterance decision part 30 decides text representing utterance contents from the dialogue system 100 and outputs the text to the voice synthesis part 40. When information representing contents of the user action is inputted from the action recognition part 20, the utterance decision part 30 decides text representing the utterance contents from the dialogue system 100 based on the information representing the inputted contents of the user action and outputs the text to the voice synthesis part 40. Note that when the presentation part 50 of the dialogue system 100 is constructed of a plurality of humanoid robots, the utterance decision part 30 may decide which humanoid robot presents the utterance. In this case, the utterance decision part 30 also outputs information indicating the humanoid robot that presents the utterance together to the voice synthesis part 40. In this case, the utterance decision part 30 may decide the partner to whom the utterance is presented, that is, whether the utterance is presented to the user or to any one humanoid robot. In this case, the utterance decision part 30 outputs the information indicating the partner to whom the utterance is presented together to the voice synthesis part 40.

[Voice Synthesis Part 40]

The voice synthesis part 40 converts text representing the utterance contents inputted from the utterance decision part 30 to a voice signal representing the utterance contents and outputs the voice signal to the presentation part 50. The method for voice synthesis carried out by the voice synthesis part 40 can be any existing voice synthesis technique and a most suitable one may be selected as appropriate in accordance with the usage environment or the like. Note that when the presentation part 50 of the dialogue system 100 is constructed of a plurality of humanoid robots, if information representing a humanoid robot that presents the utterance is inputted together with the text representing utterance contents from the utterance decision part 30, the voice synthesis part 40 outputs a voice signal representing utterance contents to the humanoid robot corresponding to the information. Furthermore, when information indicating a partner to whom the utterance is presented is also inputted together with the text representing the utterance contents and information indicating the humanoid robot that presents the utterance from the utterance decision part 30, the voice synthesis part 40 outputs the voice signal representing the utterance contents and the information indicating the partner to whom the utterance is presented to the humanoid robot corresponding to the information.

[Presentation Part 50]

The presentation part 50 is an interface for the utterance decision part 30 to present the decided utterance contents to the user. For example, the presentation part 50 is a humanoid robot manufactured by imitating the human form. This humanoid robot pronounces the voice corresponding to a voice signal representing the utterance contents inputted from the voice synthesis part 40 from the speaker 51 mounted on, for example, the head. That is, the humanoid robot presents the utterance. The speaker 51 may be enabled to pronounce the voice corresponding to the voice signal representing the utterance contents inputted from the voice synthesis part 40. That is, FIG. 1 is an example and either one of the speaker 51-1 or 51-2 may not be provided. A configuration may also be adopted in which one or more speakers or a speaker array provided with a plurality of speakers are provided in places different from the humanoid robots 50-1 and 50-2 in the vicinity of the user 101 or the like, but both the speakers 51-1 and 51-2 are not provided. Furthermore, the humanoid robot may present the utterance contents decided by the utterance decision part 30 through nonverbal action such as facial expressions and physical movement to the user. For example, nonverbal action may be presented such as nodding the head vertically to present an agreement on an immediately preceding utterance or shaking the head horizontally to present a disagreement. When presenting an utterance, the humanoid robot directs its face or whole body toward the user or the other humanoid robot, and can thereby express that it presents the utterance to the user or the other humanoid robot located in the direction the face or body is directed. When the presentation part 50 is a humanoid robot, one humanoid robot is provided for each personality (agent) joining the dialogue, for example. Hereinafter, it is assumed that there are two humanoid robots 50-1 and 50-2 as an example where two personalities join the dialogue. Note that when the presentation part 50 of the dialogue system 100 is constructed of a plurality of humanoid robots, if the utterance decision part 30 decides which humanoid robot presents the utterance, the humanoid robot 50-1 or 50-2 that receives the voice signal representing the utterance contents outputted by the voice synthesis part 40 presents the utterance. When the information indicating the partner to whom the utterance decided by the utterance decision part 30 is also presented is inputted, the humanoid robot 50-1 or 50-2 presents the utterance while directing its face or eyes in the utterance of the humanoid robot or user corresponding to the information indicating the partner to whom the utterance is presented.

Figure 2:
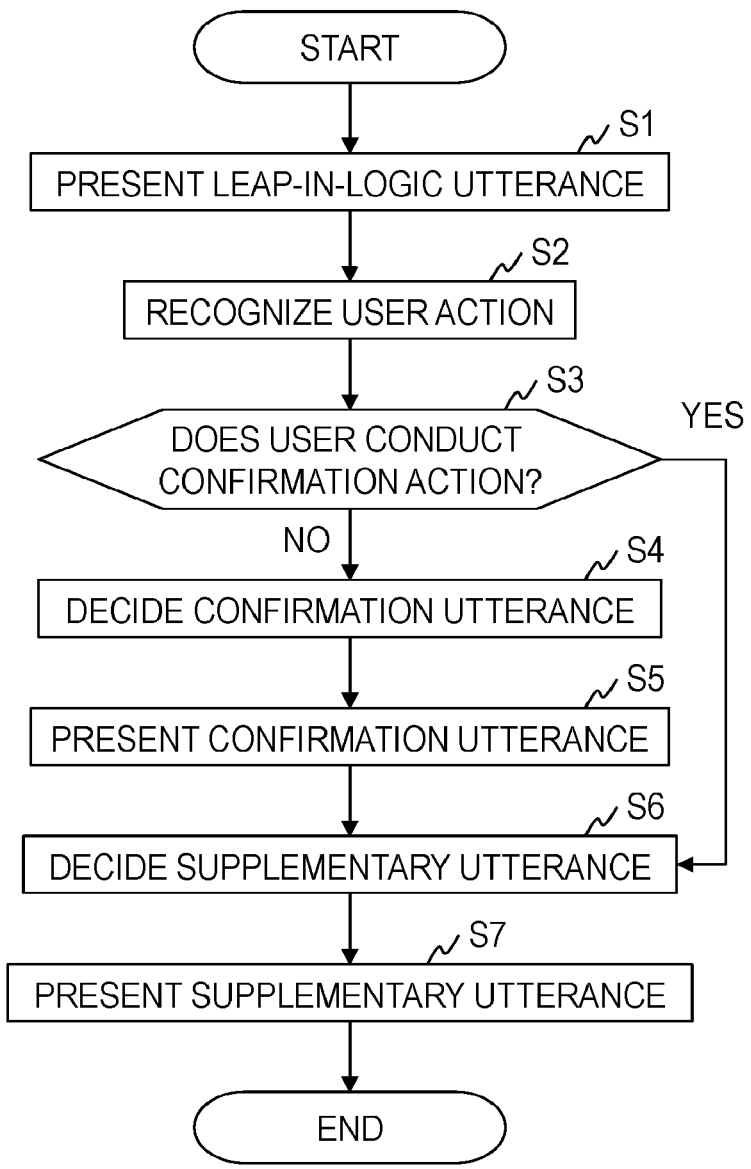
FIG. 2 is a diagram illustrating a processing procedure of a dialogue method of the embodiment.

Hereinafter, a processing procedure of the dialogue method of the embodiment will be described with reference to FIG. 2.

In step S1, the dialogue system 100 outputs a voice representing contents of a leap-in-logic utterance from the speaker 51-1 provided in the humanoid robot 50-1, that is, presents the leap-in-logic utterance. The leap-in-logic utterance is an utterance, of which a logical structure is partially missing. The logical structure is a sentence structure made up of, for example, a premise, an interpretation and a conclusion. The voice representing contents of the leap-in-logic utterance is a voice obtained by converting the text representing contents of the leap-in-logic utterance decided by the utterance decision part 30 to a voice signal by the voice synthesis part 40. The text representing contents of the leap-in-logic utterance can be generated from the text representing the utterance contents decided by the utterance decision part 30 in a normal procedure by analyzing the logical structure thereof and masking part of the information (e.g., omission, pronoun conversion).

The utterance decision part 30 may arbitrarily select text representing the contents of the utterance, for example, from among predetermined fixed phrases stored in a storage part (not shown) in the utterance decision part 30 or decided in accordance with the utterance contents up to the immediately preceding one. As for the technique of deciding the utterance contents in accordance with the utterance contents up to the immediately preceding one, one used in conventional dialogue systems may be used, and, for example, the scenario dialogue system described in Non-Patent Literature 2 or the chat-oriented dialogue system described in Non-Patent Literature 3 or 4 may be used. When the utterance decision part 30 uses the technique used in the scenario dialogue system, for example, the utterance decision part 30 selects, for a dialogue including five immediately preceding utterances, scenarios in which an inter-word distance between words included in each utterance and focus words constituting each utterance, and words and focus words included in each scenario stored in the storage part (not shown) in the utterance decision part 30 is shorter than a predetermined distance, selects text included in the selected scenario and thereby decides text representing contents of the utterance. When the utterance decision part 30 uses a technique used in the chat-oriented dialogue system, the utterance decision part 30 may decide, for example, text representing contents of the utterance according to a prescribed rule stored in the storage part (not shown) in the utterance decision part 30 using words included in the user utterance as a trigger, or automatically generate a rule based on words in a co-occurrence relation or dependency relation with words included the user utterance and decide the text representing the contents of the utterance according to the rule.

The text representing the utterance contents may also be constructed of one sentence including all the premise, interpretation and conclusion or may be constructed of one sentence including the premise, interpretation and conclusion by combining a plurality of sentences. For example, even in a dialogue between humans, when an attempt is made to change a topic handled in up to the immediately preceding dialogue to another topic, an utterance may be made by omitting a keyword suggestive of the immediately preceding topic. At this time, if the topics are not strongly related to each other, it is not possible to understand about what topic the utterance is. Such an utterance can be considered as lacking the premise that there are common features between the immediately preceding topic and the presented topic of the utterance.

When the leap-in-logic utterance is an utterance with contents that the topic handled in the immediately preceding dialogue is changed to another topic, a topic transition word indicating that the topic has been changed may be added to the start of the leap-in-logic utterance. Examples of the topic transition word include "By the way" and "I've just come up with an idea."

In step S2, the action recognition part 20 obtains and outputs information representing contents of the user action based on at least one of the acoustic signal acquired by the microphone 11 and the video signal acquired by the camera 12, that is, the action recognition part 20 recognizes the user action, and obtains and outputs information representing contents of the user action. The voice recognition part 21 in the action recognition part 20 voice-recognizes an acoustic signal corresponding to a predetermined time period after the presentation part 50 presents the leap-in-logic utterance of the acoustic signal acquired by the microphone 11 and outputs, as the output of the action recognition part 20, the text obtained as the recognition result as the text representing contents of the user utterance. The movement recognition part 22 in the action recognition part 20 recognizes the movement of the video signal corresponding to a predetermined time period after the presentation part 50 presents the leap-in-logic utterance of the video signal acquired by the camera 12, and outputs, as the output of the action recognition part 20, the time-sequential data representing contents of the user movement at each time obtained as the recognition result as the information representing contents of the user movement. Regarding the predetermined time period, a time enough to acquire the user's verbal action or non-verbal action (e.g., on the order of 3 seconds to 10 seconds) in response to the leap-in-logic utterance may be set in advance. Note that the predetermined time period may be set to 0 seconds so that no user action is acquired in response to the leap-in-logic utterance. Information representing contents of the user action outputted by the action recognition part 20 is inputted to the utterance decision part 30.

In step S3, the utterance decision part 30 determines whether or not the user has expressed a confirmation action in response to the leap-in-logic utterance for a predetermined time period based on the information representing the inputted contents of the user action, that is, based on at least one of the text representing contents of the user utterance included in the information representing the inputted contents of the user action and time-sequential data representing the contents of the user movement.

When the confirmation action is a verbal action, the confirmation action is called a "confirmation utterance." Examples of the confirmation utterance include an utterance with contents confirming information missing in the leap-in-logic utterance (question sentence or the like), an utterance with contents requesting supplement of information missing in the leap-in-logic utterance (question sentence or the like), an utterance with contents from which it is guessed that the user wants to confirm information missing in the leap-in-logic utterance, an utterance with contents from which it is guessed that the user wants to supplement information missing in the leap-in-logic utterance. When the confirmation action is a non-verbal action, the confirmation action is called a "confirmation movement." The confirmation movement is, for example, a movement with the eyes open, with the mouth open, showing an expression trying to say something. At least one of one or more confirmation utterances and one or more confirmation movements as illustrated above are stored in advance in a storage part (not shown) in the utterance decision part 30.

When the utterance decision part 30 determines whether or not the user has conducted a confirmation action for a predetermined time period regarding the leap-in-logic utterance based on the user's verbal action, the utterance decision part 30 makes such a determination, for example, as follows. The utterance decision part 30 acquires text representing contents of the user utterance from information representing contents of the user action, and when the acquired text corresponds to a confirmation utterance stored in the storage part (not shown) in the utterance decision part 30, the utterance decision part 30 determines that the user has conducted a confirmation action or when the acquired text does not correspond to the confirmation utterance stored in the storage part (not shown) in the utterance decision part 30, the utterance decision part 30 determines that the user has not conducted a confirmation action.

When the utterance decision part 30 determines whether or not the user has expressed a confirmation action for a predetermined time period regarding the leap-in-logic utterance based on the user's non-verbal action, the utterance decision part 30 makes such a determination, for example, as follows. The utterance decision part 30 acquires time-sequential data representing contents of the user movement from the information representing contents of the user action, and if the time-sequential data representing the acquired movement contents corresponds to a confirmation movement stored in the storage section (not shown) in the utterance decision part 30, the utterance decision part 30 determines that the user has conducted a confirmation action and if the time-sequential data representing the acquired movement contents does not correspond to the confirmation movement stored in the storage part (not shown) in the utterance decision part 30, the utterance decision part 30 determines that the user has not conducted a confirmation action.

When the action recognition part 20 is provided with both the voice recognition part 21 and the movement recognition part 22, the utterance decision part 30 may obtain a determination result as to whether or not the user has conducted a confirmation action in response to the leap-in-logic utterance for the predetermined time period based on both determination results of the determination based on the above-described verbal action of the user and the determination based on the above-described non-verbal action of the user. For example, upon determining that the user has conducted the confirmation action in at least one of the determination based on the above-described verbal action of the user and the determination based on the above-described non-verbal action of the user, the utterance decision part 30 determines that the user has conducted a confirmation action in response to the leap-in-logic utterance for the predetermined time period, or otherwise, the utterance decision part 30 determines that the user has not conducted a confirmation action in response to the leap-in-logic utterance for the predetermined time period.

Note that when the predetermined time period is assumed to be 0 seconds and the action recognition part 20 is configured not to acquire the user action in response to the leap-in-logic utterance, the information representing contents of the user action includes neither contents of the user utterance nor contents of the user movement, and so the utterance decision part 30 will operate in the same way as in the case where it is determined that the user has not conducted any confirmation action hereinafter.

Upon determining in step S3 that the user has conducted a confirmation action (YES), the utterance decision part 30 executes step S6 without executing neither step S4 nor step S5, or upon determining in step S3 that the user has conducted a confirmation action (NO), the utterance decision part 30 executes step S6 after executing step S4 and step S5.

In step S4, the utterance decision part 30 decides text representing contents of the confirmation utterance based on the text representing contents of the leap-in-logic utterance and outputs the decided text. For example, the utterance decision part 30 acquires the text representing contents of the confirmation utterance stored in combination with the text representing contents of the leap-in-logic utterance in the storage part (not shown) in the utterance decision part 30, and thereby decides the text representing contents of the confirmation utterance. The utterance decision part 30 may also decide a humanoid robot that presents a confirmation utterance. In this case, the utterance decision part 30 also decides a humanoid robot that presents a confirmation utterance and also outputs information specifying the humanoid robot that presents a supplementary utterance. For example, the utterance decision part 30 decides another humanoid robot 50-2 which is different from the humanoid robot 50-1 that presented the leap-in-logic utterance as the humanoid robot that presents the confirmation utterance and also outputs information specifying that the humanoid robot that presents the supplementary utterance is the humanoid robot 50-2.

In step S5, the voice synthesis part 40 converts the text representing contents of the confirmation utterance decided by the utterance decision part 30 to a voice signal representing contents of the confirmation utterance and outputs the voice signal, and the presentation part 50 outputs a voice representing contents of the confirmation utterance corresponding to the voice signal representing contents of the confirmation utterance outputted from the voice synthesis part 40. For example, the presentation part 50 outputs the voice representing contents of the confirmation utterance corresponding to the voice signal outputted from the voice synthesis part 40 from the speaker 51-2 provided for the humanoid robot 50-2 different from the humanoid robot 50-1 that presented the leap-in-logic utterance. When the utterance decision part 30 outputs information specifying a humanoid robot, the presentation part 50 outputs the voice representing contents of the confirmation utterance based on the voice signal outputted from the voice synthesis part 40 and information specifying a humanoid robot outputted from the utterance decision part 30 from the speaker (51-1 or 51-2) provided for the humanoid robot (50-1 or 50-2) specified by the utterance decision part 30.

That is, in steps S4 and S5, when the user 101 does not make any confirmation utterance for a predetermined time period, the dialogue system 100 outputs a voice representing contents of the confirmation utterance from the speaker 51-2 provided for the humanoid robot 50-2 which is different from the humanoid robot 50-1 that presented the leap-in-logic utterance. However, it is not essential for the dialogue system 100 to execute steps S4 and S5, and the dialogue system 100 may not make any confirmation utterance even when the user 101 does not make any confirmation utterance for the predetermined time period.

In step S6, the utterance decision part 30 decides text representing contents of the supplementary utterance based on text representing contents of the leap-in-logic utterance and text representing contents of the confirmation utterance, and outputs the decided text. The supplementary utterance is an utterance with contents supplementing information missing in the leap-in-logic utterance. The supplementary utterance may be one utterance or a plurality of utterances. The utterance decision part 30 may decide a humanoid robot that presents the supplementary utterance. In this case, the utterance decision part 30 also decides the humanoid robot that presents the supplementary utterance based on which humanoid robot is the humanoid robot that has presented the leap-in-logic utterance or which humanoid robot is the humanoid robot that has presented the confirmation utterance or the like and also outputs information specifying the humanoid robot that presents the supplementary utterance. When the supplementary utterance is a plurality of utterances, the utterance decision part 30 decides the humanoid robot that presents the respective utterances and outputs information specifying the humanoid robot that presents the utterances.

In step S7, the voice synthesis part 40 converts the text representing contents of the confirmation utterance decided by the utterance decision part 30 to a voice signal and outputs the voice signal, and the presentation part 50 outputs a voice representing contents of the supplementary utterance corresponding to the voice signal outputted from the voice synthesis part 40. For example, the presentation part 50 outputs the voice representing contents of the supplementary utterance corresponding to the voice signal outputted from the voice synthesis part 40 from the speaker 51-1 provided for the humanoid robot 50-1 that presented the leap-in-logic utterance. When the utterance decision part 30 also outputs information specifying the humanoid robot, the presentation part 50 outputs the voice representing contents of the supplementary utterance from the speaker (51-1 or 51-2) provided for the humanoid robot (50-1 or 50-2) specified by the utterance decision part 30 based on the voice signal outputted from the voice synthesis part 40 and the information specifying the humanoid robot outputted from the utterance decision part 30.

The supplementary utterance may include a question with contents that the user 101 can easily agree with about information missing in the leap-in-logic utterance. When this question is presented to the user, the user is more likely to make an utterance indicating that the user agrees with the contents of the supplementary utterance, and in this way, there is an effect of increasing a feeling of satisfaction of the user with respect to the description by the supplementary utterance. Furthermore, uttering affirmative contents also improves a real dialogue feeling.

SPECIFIC EXAMPLES

Hereinafter, specific examples of dialogue contents by the dialogue system of the present embodiment will be described. In the description in the following specific examples, "R" represents a robot and "H" represents a user. A number after "R" is an identifier of a humanoid robot. t(i) (i=0, 1, 2, ... ) represents an utterance in a dialogue and "i" is a number representing order of utterance. A rightward arrow (→) represents a partner of utterance. For example, "R1→H" represents that the humanoid robot R1 utters to the user H.

Specific Examples 1-1 to 1-4-3 assume utterance contents with the following logical structure.
Premise: temperature is 25 degrees.
Interpretation: air-conditioner is not functioning.
Conclusion: air-conditioner is replaced by a new one.

Specific Example 1-1

Specific Example 1-1 is an example where a leap-in-logic utterance, of which a premise of the logical structure is missing, is presented, it is determined that the user has not expressed any confirmation action, the confirmation utterance is presented from a humanoid robot which is different from the humanoid robot that has presented the leap-in-logic utterance and a supplementary utterance is presented from the humanoid robot that has presented the leap-in-logic utterance.

t(1) R1: Please replace the air-conditioner. The air-conditioner is not functioning, is it?
t(2) H: Really?
t(3) R2: Well, why do you think so?
t(4) R1: Because, the temperature is 25 degrees.
t(5) R2: I see. But, it is eco-friendly if you put up with it.

In this example, the dialogue system 100 first presents a leap-in-logic utterance t(1), of which a premise is missing, from the humanoid robot R1. This leap-in-logic utterance t(1) suddenly says a conclusion "Please replace the air-conditioner," and then says an interpretation "The air-conditioner is not functioning, is it?" which lacks the premise. Next, the dialogue system 100 acquires a user utterance t(2) which is an utterance of the user H in response to the leap-in-logic utterance t(1). The dialogue system 100 determines that the user utterance t(2) is not a confirmation utterance and presents a confirmation utterance t(3) with contents requesting supplement of information missing in the leap-in-logic utterance t(1) from the humanoid robot R2 which is different from the humanoid robot R1 that has presented the leap-in-logic utterance t(1). The dialogue system 100 then presents a supplementary utterance t(4) with contents supplementing the premise missing in the leap-in-logic utterance t(1) from the humanoid robot R1.

Specific Example 1-2-1

Specific Example 1-2-1 is an example where a leap-in-logic utterance, of which an interpretation of the logical structure is missing, is presented, an action expressed by the user after the leap-in-logic utterance is not acquired, a confirmation utterance is presented from the humanoid robot which is different from the humanoid robot that has presented the leap-in-logic utterance and a supplementary utterance is presented from the humanoid robot that has presented the leap-in-logic utterance.

t(1) R1: The temperature is 25 degrees. Please replace the air-conditioner.
t(2) R2: Well, why do you think so?
t(3) R1: The air-conditioner is not functioning, is it?
t(4) R2: I see. But, it is eco-friendly if you put up with it.

In this example, the dialogue system 100 first presents a leap-in-logic utterance t(1), of which an interpretation is missing, from the humanoid robot R1. This leap-in-logic utterance t(1) leaps from the premise "The temperature is 25 degrees" to the conclusion "Please replace the air-conditioner," where the interpretation is missing. Next, the dialogue system 100 does not acquire any action of the user H in response to the leap-in-logic utterance t(1) and presents a confirmation utterance t(2) with contents requesting supplement of information missing in the leap-in-logic utterance t(1) from the humanoid robot R2 which is different from the humanoid robot R1 that has presented the leap-in-logic utterance t(1). The dialogue system 100 then presents a supplementary utterance t(3) with contents supplementing the interpretation missing in the leap-in-logic utterance t(1) from the humanoid robot R1.

Specific Example 1-2-2

Specific Example 1-2-2 is an example where a leap-in-logic utterance, of which an interpretation of the logical structure is missing, is presented, it is determined that the user has expressed a confirmation action and the supplementary utterance is presented from the humanoid robot that has presented the leap-in-logic utterance.

t(1) R1: The temperature is 25 degrees. Please replace the air-conditioner.
t(2) H: Eh, even if you suddenly say that.
t(3) R1: The air-conditioner is not functioning, is it?
t(4) H: I see.
t(5) R2: But, it is eco-friendly if you put up with it.

In this example, the dialogue system 100 first presents a leap-in-logic utterance t(1), of which an interpretation is missing, from the humanoid robot R1 as in the case of Specific Example 1-2-1. Next, the dialogue system 100 acquires a user utterance t(2) which is an utterance of the user H in response to the leap-in-logic utterance t(1). The dialogue system 100 determines that the user utterance t(2) is the confirmation utterance t(2) with contents from which it is guessed that the user wants to confirm information missing in the leap-in-logic utterance t(1), and does not present any confirmation utterance. Next, dialogue system 100 presents a supplementary utterance t(3) with contents supplementing the interpretation missing in the leap-in-logic utterance t(1) from the humanoid robot R1. Furthermore, since the user H makes an utterance t(4) representing that the user H agrees with the supplementary utterance t(3), the dialogue system 100 presents an utterance t(5), a part ("I see") representing that the user H agrees with the supplementary utterance t(3) is omitted from the original utterance contents from the humanoid robot R2.

Specific Example 1-3

Specific Example 1-3 is an example where a leap-in-logic utterance, of which a conclusion of the logical structure is missing, is divided into a plurality of utterances and presented, it is determined that the user has not expressed any confirmation action, a confirmation utterance is presented from the humanoid robot which is different from the humanoid robot that has presented the leap-in-logic utterance and a supplementary utterance is presented from the humanoid robot that has presented the leap-in-logic utterance.

t(1) R1: The temperature is 25 degrees.
t(2) H: Yeah.
t(3) R1: The air-conditioner is not functioning, is it?
t(4) H: Maybe so.
t(5) R2: Well, do you have anything to say?
t(6) R1: Yes, please replace the air-conditioner.
t(7) R2: I see. But, it is eco-friendly if you put up with it.

In this example, a leap-in-logic utterance, of which the conclusion is missing, is divided into a leap-in-logic utterance t(1) presenting only the premise and a leap-in-logic utterance t(3) presenting only the interpretation and presented. First, the dialogue system 100 presents the leap-in-logic utterance t(1) presenting only the premise from the humanoid robot R1. Next, the dialogue system 100 acquires the user utterance t(2) which is an utterance of the user H in response to the leap-in-logic utterance t(1). The dialogue system 100 determines that the user utterance t(2) is not a confirmation utterance and presents the leap-in-logic utterance t(3) presenting only the interpretation. Next, the dialogue system 100 acquires a user utterance t(4) which is an utterance of the user H in response to the leap-in-logic utterance t(3). The dialogue system 100 determines that the user utterance t(4) is not any confirmation utterance and presents a confirmation utterance t(5) with contents requesting supplement of information missing in the leap-in-logic utterances t(1) and t(3) from the humanoid robot R2 which is different from the humanoid robot R1 that has presented the leap-in-logic utterances t(1) and t(3). The dialogue system 100 then presents a supplementary utterance t(6) with contents supplementing the conclusion missing in the leap-in-logic utterances t(1) and t(3) from the humanoid robot R1.

Specific Example 1-4-1

Specific Example 1-4-1 is an example where when a leap-in-logic utterance, of which a premise of the logical structure is missing, is presented by partially omitting the interpretation and the conclusion, it is determined that the user has expressed a confirmation action with contents confirming the omitted parts in the leap-in-logic utterance, and a supplementary utterance with contents supplementing the omitted parts in the leap-in-logic utterance is presented. Furthermore, it is determined that the user has not expressed any confirmation action with contents confirming the information missing in the leap-in-logic utterance, a confirmation utterance with contents confirming the information missing in the leap-in-logic utterance from the humanoid robot which is different form the humanoid robot that has presented the leap-in-logic utterance is presented, and a supplementary utterance with contents supplementing the information missing in the leap-in-logic utterance from the humanoid robot that has presented the leap-in-logic utterance is presented.

t(1) R1: Please replace it. It is not functioning, is it?
t(2) H: What are you talking about?
t(3) R1: The air-conditioner.
t(4) H: Uh, the air-conditioner.
t(5) R2: Well, why do you think so?
t(6) R1: Because the temperature is 25 degrees.
t(7) R2: I see. But, it is eco-friendly if you put up with it.

In this example, since a premise is missing from the humanoid robot R1, the dialogue system 100 first presents a leap-in-logic utterance t(1) from which the interpretation and the conclusion are partially omitted ("air-conditioner"). Next, the dialogue system 100 acquires a user utterance t(2) which is an utterance of the user H in response to the leap-in-logic utterance t(1). The dialogue system 100 determines that the user utterance t(2) is a confirmation utterance with contents confirming the parts omitted in the leap-in-logic utterance t(1), and presents a supplementary utterance t(3) with contents supplementing the omitted parts in the leap-in-logic utterance t(1) from the humanoid robot R1 that has presented the leap-in-logic utterance t(1). Next, the dialogue system 100 acquires a user utterance t(4) which is an utterance of the user H in response to the supplementary utterance t(3). The dialogue system 100 determines that neither user utterance t(2) nor t(4) is a confirmation utterance with contents confirming the premise missing in the leap-in-logic utterance t(1) and presents a confirmation utterance t(5) with contents confirming the premise missing in the leap-in-logic utterance t(1) from the humanoid robot R2 which is different from the humanoid robot R1 that has presented the leap-in-logic utterance t(1). The dialogue system 100 then presents a supplementary utterance t(6) with contents supplementing the premise missing in the leap-in-logic utterance t(1) from the humanoid robot R1.

Specific Example 1-4-2

Specific Example 1-4-2 is an example where when a leap-in-logic utterance, of which an interpretation of the logical structure is missing, is presented, part of a conclusion is converted to a pronoun and presented, it is determined that the user has expressed a confirmation action with contents confirming the part converted to a pronoun in the leap-in-logic utterance, a confirmation utterance with contents confirming the information missing in the leap-in-logic utterance from a humanoid robot which is different from the humanoid robot that has presented the leap-in-logic utterance is presented, and a supplementary utterance with contents supplementing the information missing in the leap-in-logic utterance from the humanoid robot that has presented the leap-in-logic utterance is presented.

t(1) R1: The temperature is 25 degrees. Please do that thing for the air-conditioner.
t(2) H: Eh, do you mean I buy a new one?
t(3) R2: Well, why do you think so?
t(4) R1: Because that means that the air-conditioner is not functioning, is it?
t(5) R2: I see. But, it is eco-friendly if you put up with it.

In this example, the dialogue system 100 first presents a leap-in-logic utterance t(1), of which an interpretation is missing and a part of the conclusion ("replacement") is converted to a pronoun ("that thing"), from the humanoid robot R1. Next, the dialogue system 100 acquires a user utterance t(2) which is an utterance of the user H in response to the leap-in-logic utterance t(1). The dialogue system 100 determines that the user utterance t(2) is a confirmation utterance with contents confirming the part converted to a pronoun in the leap-in-logic utterance t(1) but it is not a confirmation utterance with contents confirming the interpretation missing in the leap-in-logic utterance t(1), and presents a confirmation utterance t(3) with contents confirming the interpretation missing in the leap-in-logic utterance t(1) from the humanoid robot R2 which is different from the humanoid robot R1 that has presented the leap-in-logic utterance t(1). The dialogue system 100 then presents a supplementary utterance t(4) with contents supplementing the interpretation missing in the leap-in-logic utterance t(1) from the humanoid robot R1. The part ("replacement") converted to a pronoun has already been described in the user utterance t(2), and so the supplementary utterance t(4) supplements only the interpretation missing in the leap-in-logic utterance t(1).

Specific Example 1-4-3

Specific Example 1-4-3 is an example where a leap-in-logic utterance, of which a conclusion of the logical structure is missing, is divided into a plurality of utterances and presented, it is determined that the user has not expressed any confirmation action, a confirmation utterance is presented from a humanoid robot which is different from the humanoid robot that has presented the leap-in-logic utterance, and when a supplementary utterance with contents supplementing the conclusion missing in the leap-in-logic utterance is presented from the humanoid robot that has presented the leap-in-logic utterance, part of the conclusion is converted to a pronoun and presented, it is determined that the user has expressed a confirmation action to confirm the part converted to a pronoun in the supplementary utterance, and a supplementary utterance with contents supplementing the part converted to a pronoun in the supplementary utterance is presented from the humanoid robot that has presented the leap-in-logic utterance.

t(1) R1: The temperature is 25 degrees.
t(2) H: Yeah.
t(3) R1: The air-conditioner is not functioning, is it?
t(4) H: Maybe so.
t(5) R2: Well, do you have anything to say?
t(6) R1: Yes, please do that thing for the air-conditioner.
t(7) H: What is "that thing" ?
t(8) R1: Please replace it.
t(9) R2: I see. But, it is eco-friendly if you put up with it.

In this example, the leap-in-logic utterance, of which a conclusion is missing, is divided into a leap-in-logic utterance t(1) presenting only a premise and a leap-in-logic utterance t(3) presenting only an interpretation and presented. First, the dialogue system 100 presents the leap-in-logic utterance t(1) presenting only the premise from the humanoid robot R1. Next, the dialogue system 100 acquires a user utterance t(2) which is an utterance of the user H in response to the leap-in-logic utterance t(1). The dialogue system 100 determines that the user utterance t(2) is not a confirmation utterance, and presents the leap-in-logic utterance t(3) presenting only the interpretation. Next, the dialogue system 100 acquires a user utterance t(4) which is an utterance of the user H in response to the leap-in-logic utterance t(3). The dialogue system 100 determines that the user utterance t(4) is not a confirmation utterance, and presents a confirmation utterance t(5) with contents requesting supplement of information missing in the leap-in-logic utterances t(1) and t(3) from the humanoid robot R2 which is different from the humanoid robot R1 that has presented the leap-in-logic utterances t(1) and t(3). The dialogue system 100 presents a supplementary utterance t(6) with contents supplementing the conclusion missing in the leap-in-logic utterances t(1) and t(3) from the humanoid robot R1, and at this time, the dialogue system 100 converts part of the conclusion to a pronoun ("that thing") and presents the supplementary utterance t(6). Next, the dialogue system 100 acquires a user utterance t(7) which is an utterance of the user H in response to the supplementary utterance t(6). The dialogue system 100 determines that the user utterance t(7) is a confirmation utterance with contents confirming the part converted to a pronoun in the supplementary utterance t(6) and presents a supplementary utterance t(8) with contents supplementing the part converted to a pronoun in the supplementary utterance t(6) from the humanoid robot R1 that has presented the supplementary utterance t(6). Since the information ("air-conditioner") presented in the supplementary utterance t(6) is redundant, the supplementary utterance t(8) describes only the part converted to a pronoun in the supplementary utterance t(6).

Specific Example 2-1

Specific Example 2-1 is an example where a leap-in-logic utterance, of which a premise and an interpretation of the logical structure are missing, is presented, it is determined that the user has expressed a confirmation action, and the supplementary utterance with contents supplementing the premise and the interpretation is divided into a plurality of utterances, shared by a plurality of humanoid robots and presented. Furthermore, this is an example where when a plurality of supplementary utterances are shared and presented by the humanoid robots, a question with contents that the user can hardly deny is included to induce the user to make an utterance indicating that the user agrees.

t(1) R1: Humans do not always need living flesh, don't they?
t(2) H: What do you mean?
t(3) R1: Because, nowadays many people live two-dimensionally.
t(4) R2: Well, that's right.
t(5) R1: VR is also amazing recently.
t(6) R2: That's fantastic.
t(7) R1→H: In addition, all humans do work using some tools, and you do the same, don't you?
t(8) H: Well, that's right.
t(9) R1: Even if they do not have living flesh, they can get pleasure, do a job and it seems they do not need the living flesh so much.
t(10) R2: Well, it seems so if you say that.

In this example, the dialogue system 100 first presents a leap-in-logic utterance t(1), of which a premise and an interpretation are missing and which states only a conclusion, from the humanoid robot R1. Next, the dialogue system 100 acquires a user utterance t(2) which is an utterance of the user H in response to the leap-in-logic utterance t(1). The dialogue system 100 determines that the user utterance t(2) is a confirmation utterance with contents confirming the information missing in the leap-in-logic utterance t(1), divides the supplementary utterance with contents supplementing the premise and the interpretation from the humanoid robot R1 that has presented the leap-in-logic utterance t(1) into a plurality of utterances t(3), t(5), t(7) and t(9) and presents them. At this time, the dialogue system 100 presents them as a dialogue between the humanoid robot R1 and the other humanoid robot R2 in order to present the supplementary utterance in a natural flow. Furthermore, the dialogue system 100 includes a supplementary utterance t(7) which is a question with contents that the user H can hardly deny, thereby induces the user H to make an utterance t(8) to indicate agreement, thus improving a feeling of satisfaction and a real dialogue feeling.

Specific Example 2-2

Specific Example 2-2 is an example where a leap-in-logic utterance, of which a premise and an interpretation of the logical structure are missing, is presented, it is determined that the user has not expressed a confirmation action, the humanoid robot which is different from the humanoid robot that has presented the leap-in-logic utterance presents a confirmation utterance, and the humanoid robot that has presented the leap-in-logic utterance presents a supplementary utterance.

t(1) R1: Humans do not always need living flesh, don't they?

t(2) H: (Silence)

t(3) R2: What do you mean?

t(4) R1: Because, many people live two-dimensionally nowadays.

t(5) R2: Well, that's right.

This example is an example where in Specific Example 2-1, the user H has not expressed any confirmation action. First, the dialogue system 100 presents a leap-in-logic utterance t(1), of which a premise and an interpretation are missing and which states only a conclusion, from the humanoid robot R1. Next, the dialogue system 100 acquires a user utterance t(2) which is an utterance of the user H in response to the leap-in-logic utterance t(1). Since the user H has not expressed any action for a predetermined time period, the dialogue system 100 determines that the user H has not expressed any confirmation action and presents a confirmation utterance t(3) with contents confirming information missing in the leap-in-logic utterance t(1) from the humanoid robot R2 which is different from the humanoid robot R1 that uttered the leap-in-logic utterance t(1). The dialogue system 100 then presents a supplementary utterance t(4) with contents supplementing the premise missing in the leap-in-logic utterance t(1) from the humanoid robot R1.

Specific Example 3

Specific Example 3 is an example where when a leap-in-logic utterance, of which a premise of the logical structure is missing, is presented, a topic transition word indicating that the topic is changed is added and presented. Furthermore, the supplementary utterance is divided into a plurality of utterances, shared and presented by a plurality of humanoid robots, and in that case, a question with contents that the user can hardly deny is included so as to induce the user to make an utterance to indicate agreement.

t(1) R1: I have just come up with an idea that with the presence of robots all around, humans could live more comfortably, couldn't they?

t(2) H: Uh?

t(3) R2: What are you talking about?

t(4) R1: Ah, sorry, I just talk about work. Employees at shops cannot relax on Year-end and New Year's day, can they?

t(5) R2: Yeah.

t(6) R1: If robots work at such places instead, I believe humans will surely be glad even if the quality of work goes down a bit.

t(7) R2→H: Hmm, glad?

t(8) H: Well, it could be.

t(9) R2: Hmm, yeah, that's also true.

t(10) R1: Well, if more people want to spend New Year's day with robots, it may be a little different.

In this example, after presenting a topic transition word "I have just come up with an idea" from the humanoid robot R1, the dialogue system 100 first presents a leap-in-logic utterance t(1), of which a premise is missing. Next, the dialogue system 100 acquires a user utterance t(2) which is an utterance of the user H in response to the leap-in-logic utterance t(1). The dialogue system 100 determines that the user utterance t(2) is a confirmation utterance with contents confirming information missing in the leap-in-logic utterance t(1) and presents a confirmation utterance t(3) with contents confirming information missing in the leap-in-logic utterance t(1) from the humanoid robot R2 which is different from the humanoid robot R1 that has presented the leap-in-logic utterance t(1). Next, the dialogue system 100 divides the supplementary utterance with contents supplementing a premise and an interpretation into a plurality of utterances t(4), t(6) and t(10) and presents them. At this time, the dialogue system 100 presents the utterances as a dialogue between the humanoid robot R1 and the other humanoid robot R2 in order to present the supplementary utterance in a natural flow. Furthermore, the dialogue system 100 includes a supplementary utterance t(7) which is a question with contents that it is hard for the user H to deny and thereby induces the user H to make an utterance t(8) to indicate agreement.

Specific Example 4

Specific Example 4 is an example where when a topic transition takes place, a leap-in-logic utterance that omits common features with the immediately preceding topic which is a premise of a new topic is presented, it is determined that the user has expressed a confirmation action to confirm information missing in the leap-in-logic utterance, and a supplementary utterance with contents supplementing the information missing in the leap-in-logic utterance is presented.

t(1) R1: In Okinawa, t(2) H: What?

t(3) R1: Do you know that a transport airplane under training has crashed?

t(4) H: Wow, really, I didn't know that.

t(5) R2: I heard about that and they say two people were injured.

t(6) R1: It's scary, isn't it?

t(7) R2: Speaking of which, the majority of people say "two islands restoration first."

t(8) H: Hmm? Northern Territories?

t(9) R2: Oh yeah, the former islanders questionnaire.

t(10) R1: I'm afraid, I don't know.

In this example, the dialogue system 100 first makes dialogues t(1) to t(6) with the user H regarding a topic related to a certain current event ("transport airplane crashed in Okinawa") as a first topic. Next, the dialogue system 100 presents a topic transition word "Speaking of which" and presents a topic-inducing utterance t(7) not including at least one of words (e.g., "the former islanders questionnaire" or "Northern Territories") indicating the premise of the second topic which is the topic less relevant to the first topic ("the majority of people say "two islands restoration first" according to the former islanders questionnaire relating to Northern Territories) although it is a current event. Next, the dialogue system 100 acquires a user utterance t(8) which is an utterance of the user H in response to the leap-in-logic utterance t(7). The dialogue system 100 determines that the user utterance t(8) is a confirmation utterance with contents confirming the premise missing in the leap-in-logic utterance t(7) and presents the supplementary utterance t(8) with contents supplementing the premise missing in the leap-in-logic utterance t(7) from the humanoid robot R2 that has presented the leap-in-logic utterance t(7).

[Modifications]

Although an example has been described in the aforementioned embodiments where a dialogue is conducted with voices using humanoid robots as agents, the presentation part of the aforementioned embodiments may be a humanoid robot having a physical body or the like or a robot without any physical body or the like. The dialogue technique of the present invention is not limited to the aforementioned ones, but it is also possible to adopt a form in which a dialogue is conducted using an agent provided with neither physical entity such as a humanoid robot nor vocalization mechanism. One such form is, for example, a form in which a dialogue is conducted using an agent displayed on a computer screen. More specifically, the present dialogue system is also applicable to a form in which in a group chat such as "LINE" (registered trademark) or "2 Channel" (registered trademark) whereby a plurality of accounts conduct dialogues using text messages, a dialogue is conducted between a user account and an account of a dialogue apparatus. In this form, the computer having a screen to display the agent needs to be located near a person, but the computer and the dialogue apparatus may be connected via a network such as the Internet. That is, the present dialogue system is applicable not only to dialogues actually made face to face between speakers such as a human and a robot, but also to dialogues made between speakers communicating with each other via a network.

Figure 3:
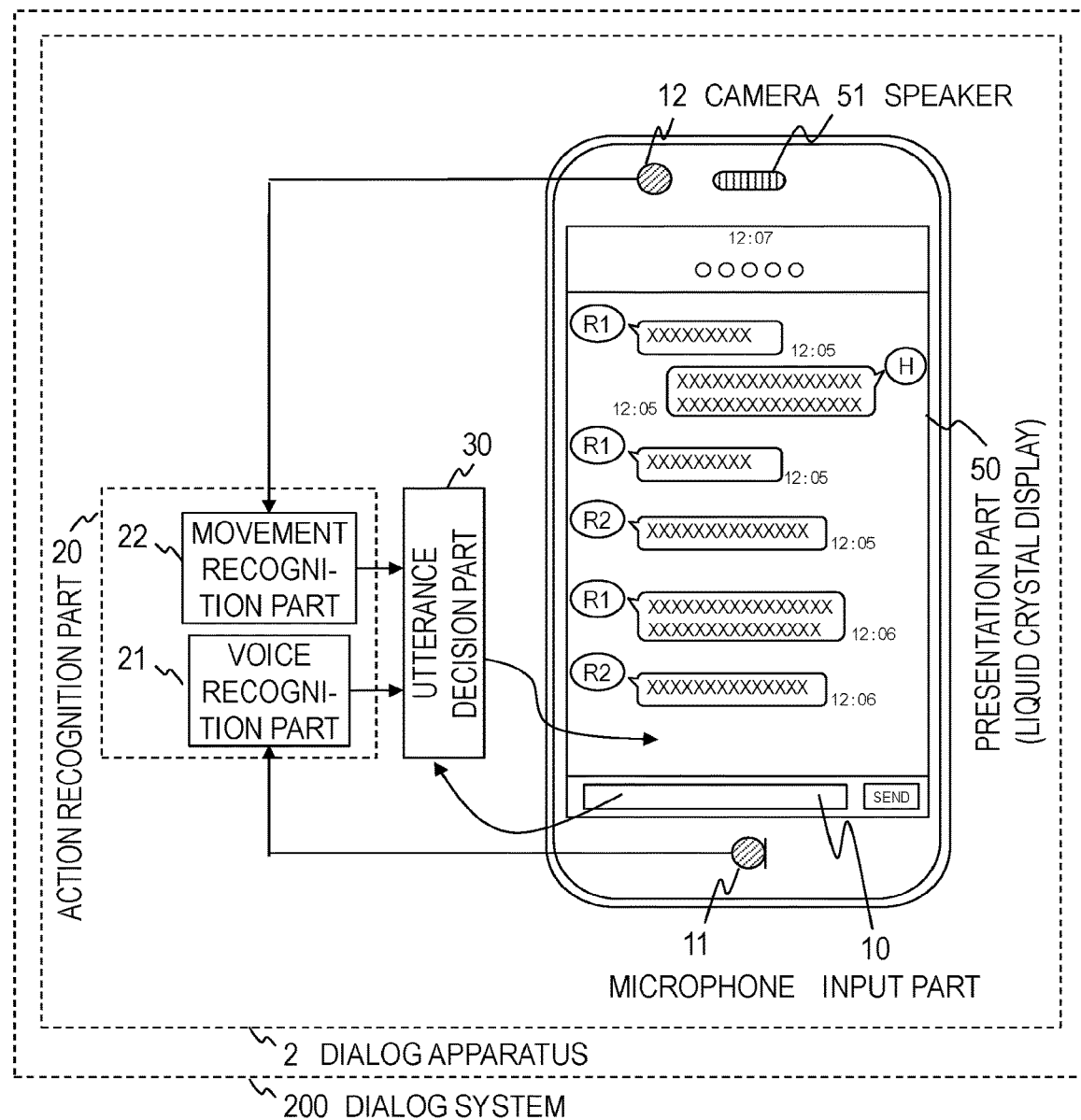
FIG. 3 is a diagram illustrating a functional configuration of a dialogue system according to a modification.

As shown in FIG. 3, a dialogue system 200 according to a modification is constructed of, for example, one dialogue apparatus 2. The dialogue apparatus 2 of the modification is provided with, for example, an input part 10, an action recognition part 20, an utterance decision part 30 and a presentation part 50. The action recognition part 20 is provided with, for example, a voice recognition part 21 and a movement recognition part 22. The dialogue apparatus 2 may also be provided with, for example, a microphone 11, a camera 12 and a speaker 51.

The dialogue apparatus 2 of the modification is an information processing apparatus such as a mobile terminal such as a smartphone or tablet or a desk top type or lap top type personal computer. The following description will be given assuming that the dialogue apparatus 2 is a smartphone. The presentation part 50 is a liquid crystal display provided for the smartphone. A window for a chat application is displayed on this liquid crystal display and dialogue contents of a group chat are displayed in a time sequence in the window. The group chat is a function whereby a plurality of accounts mutually contribute text messages in the chat and develop the dialogue. A plurality of virtual accounts corresponding to virtual personalities controlled by the dialogue apparatus 2 and the user's account participate in this group chat. That is, the present modification is an example of a case where the agent is a virtual account displayed on the liquid crystal display of the smartphone which is a dialogue apparatus. The user can input utterance contents to the input part 10 which is an input area provided in a window of the group chat using a software keyboard and contribute to the group chat through the own account. The utterance decision part 30 decides the utterance contents from the dialogue apparatus 2 based on the contribution from the user's account and contributes to the group chat through each virtual account. Note that a configuration may also be adopted in which the user verbally inputs utterance contents to the input part 10 using the microphone 11 and the voice recognition function mounted on the smartphone. Another configuration may also be adopted in which utterance contents obtained from each dialogue system are outputted from the speaker 51 with a voice corresponding to each virtual account using the speaker 51 and the voice synthesis function mounted on the smartphone.

Although the embodiments of the present invention have been described so far, the specific configuration is not limited to these embodiments, and it goes without saying that design changes or the like made as appropriate without departing from the spirit and scope of the present invention are included in the present invention. The various processes described above in the embodiments may be executed not only in time-sequentially according to the description order except the order of utterances presented by the presentation part, but also in parallel or individually according to a processing capacity of the apparatus that executes the processes or as required.

[Program and Recording Medium]

When the various processing functions of the respective apparatuses described in the above-described embodiments are implemented by a computer, processing contents of the functions that should be possessed by the respective apparatuses are written by a program. Furthermore, the various processing functions of the respective apparatuses are implemented on the computer by executing the program on the computer.

The program that writes the processing contents can be recorded in a computer-readable recording medium. Examples of the computer-readable recording medium include a magnetic recording apparatus, an optical disk, a magneto-optical recording medium, a semiconductor memory or any medium.

This program is distributed through, for example, sales, transfer or rental of a portable recording medium such as DVD or CD-ROM that records the program. The program may also be distributed by storing the program in a storage apparatus of a server computer, and transferring the program from the server computer to another computer.

The computer that executes such a program temporarily stores a program recorded in a portable storage medium or a program transferred from the server computer in the own storage apparatus. At the time of execution of the process, this computer reads the program stored in the own storage apparatus and executes the process according to the read program. As another form of execution of the program, the computer may read the program directly from a portable recording medium and execute the process according to the program. Furthermore, every time the program is transferred to the computer from the server computer, the process may be executed successively according to the received program. The above-described process may be executed by a so-called ASP (Application Service Provider) type service in which without the server computer transferring the program to the computer, the processing function is implemented only by instructing execution and acquiring the result. Note that the program in the present form includes a semi-program which is information used for processing by a computer (data which is not a direct instruction on the computer but has a characteristic of defining processing of the computer).

In this form, although each apparatus is configured by executing a predetermined program on the computer, at least some of these processing contents may be implemented by hardware.

What is claimed is:

1. A dialogue method executed by a dialogue system that conducts a dialogue with a user, the method comprising:
an utterance decision step in which, from contents of an utterance of a sentence structure made up of a premise, an interpretation and a conclusion decided by a predetermined procedure, an utterance decision part of the dialogue system generates a leap-in-logic utterance which is an utterance missing partially information of the premise, the interpretation and the conclusion in the sentence structure of the contents of the utterance;

an utterance presentation step in which a presentation part of the dialogue system presents the leap-in-logic utterance;

a confirmation receiving step in which an input part of the dialogue system receives a user action after the leap-in-logic utterance is presented; and a supplementary presentation step in which where the user action is a confirmation action which is an action to confirm information missing in the leap-in-logic utterance, the presentation part of the dialogue system presents a supplementary utterance which is an utterance describing the missing information.

2. The dialogue method according to claim 1, further comprising:

a confirmation presentation step in which when the user action is not a confirmation action, the presentation part of the dialogue system presents an utterance confirming information missing in the leap-in-logic utterance.

3. The dialogue method according to claim 1, wherein the leap-in-logic utterance is an utterance which is an utterance with a second topic which is a topic less relevant to the topic of the dialogue made before the leap-in-logic utterance and in which at least one of words representing the second topic is not included.

4. The dialogue method according to claim 1, wherein the leap-in-logic utterance is an utterance with a topic less relevant to the topic of the dialogue made before the leap-in-logic utterance and which is an utterance, at a beginning of which a topic transition word indicating that a topic is changed is added.

5. The dialogue method according to claim 1, wherein the supplementary utterance is an utterance including a question with contents with which the user can easily agree regarding the missing information.

6. A non-transitory computer-readable recording medium having a program recorded thereon for causing a computer to execute each step of the dialogue method according to claim 1.

7. A dialogue system that conducts a dialogue with a user, the dialogue system comprising processing circuitry configured to:

decide contents of an utterance of a sentence structure made up of a premise, an interpretation and a conclusion by a predetermined procedure;

generate a leap-in-logic utterance which is an utterance missing partially information of the premise, the interpretation and the conclusion in the sentence structure of the contents of the utterance;

present the leap-in-logic utterance;

decide a supplementary utterance which is an utterance describing information missing in the leap-in-logic utterance;

present the leap-in-logic utterance;

receive a user action after the leap-in-logic utterance is presented; and present the supplementary utterance where the user action is a confirmation action which is an action for confirming the information missing in the leap-in-logic utterance.

8. A dialogue apparatus that decides an utterance presented by a dialogue system comprising at least a presentation part that presents an utterance and an input part receives a user action, the dialogue apparatus comprising processing circuitry configured to:

decide contents of an utterance of a sentence structure made up of a premise, an interpretation and a conclusion by a predetermined procedure;

generate a leap-in-logic utterance which is an utterance missing partially information of the premise, the interpretation and the conclusion in the sentence structure of the contents of the utterance;

and decide a supplementary utterance which is an utterance describing information missing in the leap-in-logic utterance, where the supplementary utterance be presented where the user action presented after the leap-in-logic utterance is an action for confirming the information missing in the leap-in-logic utterance.

9. A non-transitory computer-readable recording medium having a program recorded thereon for causing a computer to function as the dialogue apparatus according to claim 8.

* * * * *